L. R. DEAN.
VINE CUTTER.
APPLICATION FILED AUG. 28, 1908.
930,846.
Patented Aug. 10, 1909.
2 SHEETS—SHEET 1.
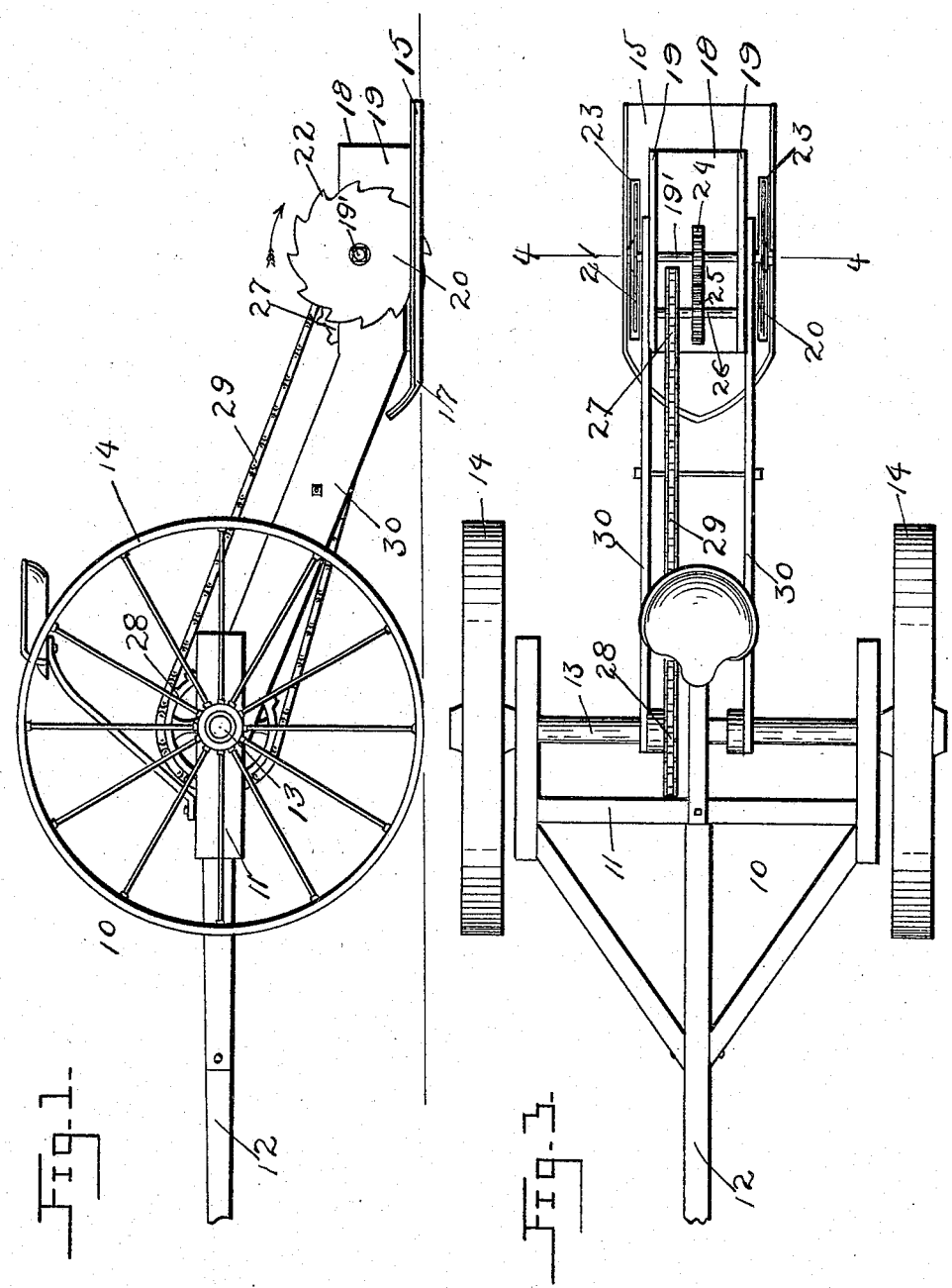
Witnesses
Inventor
L. R. Dean.
By Woodward & Chandler
Attorney

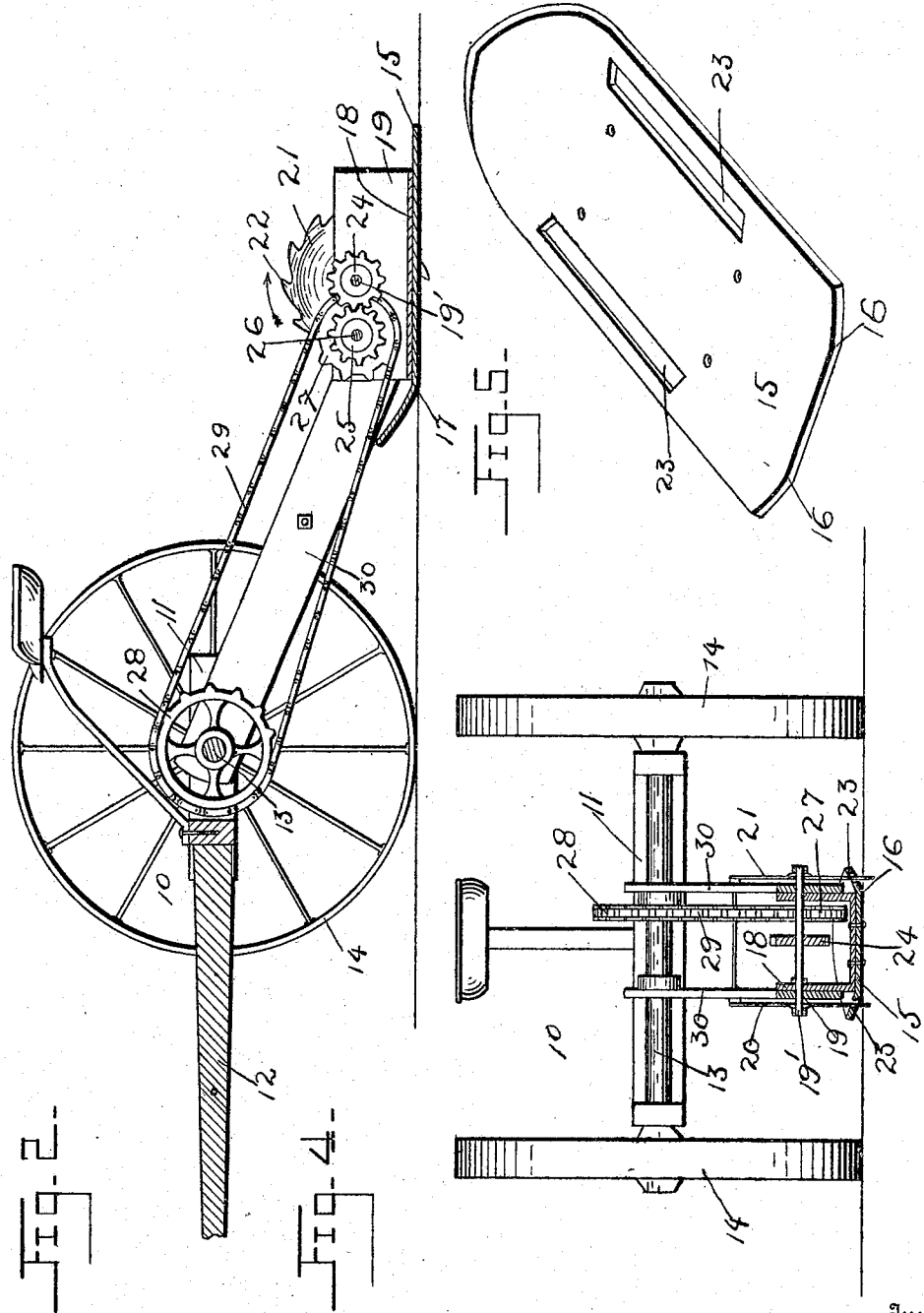

UNITED STATES PATENT OFFICE.

LUCIAN R. DEAN, OF HARLESTON, MISSISSIPPI.

VINE-CUTTER.

No. 930,846.　　　Specification of Letters Patent.　　　Patented Aug. 10, 1909.

Application filed August 28, 1908. Serial No. 450,678.

*To all whom it may concern:*

Be it known that I, LUCIAN R. DEAN, a citizen of the United States, residing at Harleston, in the county of Jackson and State of Mississippi, have invented certain new and useful Improvements in Vine-Cutters, of which the following is a specification.

This invention relates to vine cutters, and has for an object to provide a machine of this character which will be simple in construction, efficient and which may be manufactured at a relatively low figure.

A further object of this invention is to provide a vine cutter which may be driven through a field and which includes means adapted for movement over ridges for effectively cutting the vines.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side view of the present invention, Fig. 2 is a longitudinal sectional view, Fig. 3 is a top plan view, Fig. 4 is a transverse sectional view on the line 4—4 of Fig. 3, Fig. 5 is a detail perspective view of the traveler plate.

Referring now more particularly to the drawings, there is shown a vine cutter 10 comprising a frame 11 which carries a longitudinally disposed tongue 12 for receiving two draft animals. The frame is provided with a horizontally disposed revoluble shaft 13 upon which are fixed wheels 14 having relatively large or broad surfaces as shown.

A traveler plate 15 is located rearwardly of the wheels 14 and is curved transversely as indicated at 16. The plate at its forward end is curled upwardly as indicated at 17 to facilitate its movement in the travel of the machine. The plate 15 is provided with a bracket 18 which carries spaced parallel portions 19 in which is mounted a revoluble shaft 19'. The shaft 19', carries vine cutting disks 20 and 21 which are each provided with peripheral hooked teeth 22. The disks are disposed with portions beneath the plate 15 and are mounted for movement in longitudinally disposed slots 23 formed in the plate. The shaft 19' is provided with a pinion 24 in mesh with a pinion 25 carried by the shaft 26 which is also mounted in the parallel portions of the bracket 18. The shaft 26 carries a sprocket gear 27, and the shaft 13 is provided with a sprocket gear 28. The gears 27 and 28 respectively thus receive a drive chain 29. While it is particularly desirable to provide a chain, it will of course be understood that a belt or the like may be employed. Parallel spaced arms 30 are secured to the bracket 18, and at the outer ends, these arms are loosely mounted upon the shaft 13.

In operation, draft animals are attached to the tongue 12 as will be readily understood, the animals being thus positioned in a manner whereby they may travel between ridges, the position of the animals between the ridges being such that the traveler plate is disposed for movement along the top of the ridge as is obvious. In the travel of the machine it will of course be understood that power from the shaft 13 is transmitted to the disk shaft to revolve the disks in the direction of the arrow as indicated in the drawings, the teeth of the disks being such that they will effectively lift the vine and cut them in an easy manner.

What is claimed is:—

1. A vine cutter comprising a wheeled frame, a traveler plate connected with the frame, and a revoluble disk mounted upon the traveler plate and provided with peripheral teeth.

2. A vine cutter comprising a wheeled frame, a traveler plate carried by the frame, and revoluble spaced disk supported upon the traveler plate and provided with hooked peripheral teeth.

3. A vine cutter comprising a wheeled shaft, a traveler plate connected to the shaft, parallel spaced shafts carried by the plate, one of said last named shafts being geared to its adjacent shaft, vine cutting means carried on one of the shafts, and driving means engaged with the wheeled shaft and one of said parallel shafts.

4. A vine cutter comprising a wheeled axle, a traveler plate connected with the axle, said plate having longitudinally disposed parallel spaced slots formed therein, disks revolubly mounted upon the plate and disposed for movement in the slots, and means for revolving said disks.

5. A vine cutter comprising a wheeled frame, a traveler plate connected with the frame, said traveler plate having slots therein, and revoluble disks mounted upon the traveler plate and extending through the slots.

6. A farm implement comprising a traveler plate arranged for movement over the surface of the ground, said plate having a slot therein, and a toothed disk mounted for rotation upon the traveler plate, said disk extending downwardly through the slot of the traveler plate.

7. A farm implement comprising a traveler plate arranged for movement over the surface of the ground, said plate having a slot therein, a toothed disk mounted for rotation upon the traveler plate, said disk extending downwardly through the slot of the traveler plate, and means for revolving the disk.

8. A cutter of the class described comprising a plate, said plate having its parallel edge portions turned upwardly, each of said upwardly turned edge portions having a longitudinal slot therein, a revoluble cutting disk mounted to extend through each slot, and means for revolving the disks.

9. A vine cutter comprising a traveler plate, said plate having longitudinal slots adjacent to its edges, a bracket secured to the plate between the slots, a transverse shaft journaled in the brackets, a toothed disk mounted upon each end of the shaft, said disk extending downwardly through the slots of the traveler plate, means for moving the traveler plate over the surface of the ground, and means for revolving the shaft.

10. A vine cutter comprising a traveler plate having its side portion directed upwardly and having its forward end directed upwardly, said traveler plate having longitudinal slots formed in its upwardly directed side portions, a bracket secured upon the traveler plate between the upwardly directed side portions, said brackets including parallel portions, a revoluble shaft mounted in the parallel portions of the brackets, disks mounted upon the shaft outwardly of the parallel portions of the brackets, said disks extending downwardly through the slots of the traveler plate, and means for revolving the shaft.

11. A vine cutter comprising a wheeled axle, rearwardly extending arms pivoted upon the axle, a bracket mounted between the rearward ends of the arms, a transverse shaft journaled in the brackets, a traveler plate secured to the lower portion of the brackets, a disk mounted upon the shaft and extending below the under face of the traveler plate, and means connected with the disk and with the axle for simultaneous rotation thereof.

12. A vine cutter comprising a wheeled axle, a traveler plate connected with the axle, a bracket mounted upon the traveler plate, a pair of shafts journaled in the brackets, intermeshing gears carried by the shafts, a disk carried by one of the shafts, and connections between the wheeled axle and the other shaft for rotation of said axle and said shaft in a common direction.

13. A vine cutter comprising a plate, a revoluble cutting disk mounted to extend below the plate, and means for revolving the disk.

14. A vine cutter comprising a vine depressing plate having a slot therein, and a revoluble cutting disk arranged to extend through the slot and in position to cut the vines engaged by the under face of the plate.

In testimony whereof I affix my signature, in presence of two witnesses.

LUCIAN R. DEAN.

Witnesses:
HARVEY W. MORRIS,
F. S. MCINNIS.